United States Patent
Ozaki et al.

(10) Patent No.: US 9,328,399 B2
(45) Date of Patent: May 3, 2016

(54) OPERATING METHOD IN HYDROMETALLURGY OF NICKEL OXIDE ORE

(71) Applicant: SUMITOMO METAL MINING CO., LTD., Tokyo (JP)

(72) Inventors: Yoshitomo Ozaki, Ehime (JP); Jun-ichi Takahashi, Ehime (JP); Yu Yamashita, Ehime (JP); Hideki Ohara, Ehime (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 14/365,842

(22) PCT Filed: Dec. 14, 2012

(86) PCT No.: PCT/JP2012/082491
§ 371 (c)(1),
(2) Date: Jun. 16, 2014

(87) PCT Pub. No.: WO2013/094530
PCT Pub. Date: Jun. 27, 2013

(65) Prior Publication Data
US 2014/0348732 A1     Nov. 27, 2014

(30) Foreign Application Priority Data

Dec. 20, 2011 (JP) .................................. 2011-278859
Jun. 19, 2012 (JP) .................................. 2012-137957

(51) Int. Cl.
| | |
|---|---|
| *C22B 3/00* | (2006.01) |
| *C01F 5/12* | (2006.01) |
| *C01B 17/50* | (2006.01) |
| *C01F 11/46* | (2006.01) |
| *C01F 5/40* | (2006.01) |

(52) U.S. Cl.
CPC ............. *C22B 23/043* (2013.01); *C01B 17/501* (2013.01); *C01F 5/12* (2013.01); *C01F 5/40* (2013.01); *C01F 11/46* (2013.01); *C01P 2002/72* (2013.01); *C01P 2004/03* (2013.01)

(58) Field of Classification Search
None
See application file for complete search history.

(56) References Cited

U.S. PATENT DOCUMENTS

| | | |
|---|---|---|
| 4,225,573 A | 9/1980 | Kobayashi |
| 4,298,379 A | 11/1981 | Zambrano |

(Continued)

FOREIGN PATENT DOCUMENTS

| | | |
|---|---|---|
| EP | 1777304 A1 * | 4/2007 |
| JP | A-57-500021 | 1/1982 |

(Continued)

OTHER PUBLICATIONS

Feb. 19, 2013 International Search Report issued in International Application No. PCT/JP2012/082491 (with translation).

(Continued)

*Primary Examiner* — Melissa Swain
(74) *Attorney, Agent, or Firm* — Oliff PLC

(57) ABSTRACT

It is an object to provide a method for producing magnesium oxide by which magnesium oxide being high in purity and low in impurity content can be produced simply and efficiently from a sulfuric acid solution containing magnesium and calcium such as waste water. In the present invention, calcium is precipitated as calcium sulfate and separated by concentrating a sulfuric acid solution containing magnesium and calcium, and magnesium is precipitated as magnesium sulfate and separated by further concentrating the solution resulting from the separation of calcium. The separated magnesium sulfate is roasted together with a reductant, so that magnesium oxide and sulfur dioxide are obtained. The resulting magnesium oxide is washed to produce magnesium oxide with high purity.

5 Claims, 5 Drawing Sheets

(56) References Cited

U.S. PATENT DOCUMENTS

| | | |
|---|---|---|
| 2008/0025892 A1 | 1/2008 | Roche et al. |
| 2011/0110832 A1 | 5/2011 | Clareti Pereira et al. |

FOREIGN PATENT DOCUMENTS

| | | |
|---|---|---|
| JP | A-4-103728 | 4/1992 |
| JP | A-2000-93739 | 4/2000 |
| JP | A-2005-523996 | 8/2005 |
| JP | A-2005-350766 | 12/2005 |
| JP | A-2008-528421 | 7/2008 |
| JP | A-2009-520661 | 5/2009 |
| JP | A-2011-241446 | 12/2011 |

OTHER PUBLICATIONS

Aug. 6, 2015 Search Report issued in European Application No. 12860169.7.

* cited by examiner

OPERATING METHOD IN HYDROMETALLURGY OF NICKEL OXIDE ORE

TECHNICAL FIELD

The present invention relates to a method for producing magnesium oxide, and particularly to a method for producing magnesium oxide by which magnesium oxide being low in impurity and high in purity level can be produced from a sulfuric acid solution containing magnesium and calcium.

The present application claims the priority based on Japanese Patent Application No. 2011-278859 filed Dec. 20, 2011 and Japanese Patent Application No. 2012-137957 filed Jun. 19, 2012, which are hereby incorporated by reference in its entirety.

BACKGROUND ART

Magnesium oxide is widely used as a fire brick material, catalysts, and filler for cement or paper pulp, and so on as well as for an application as a raw material for magnesium metal. In such applications, especially in the case of using for a metal to form an alloy or a material that requires corrosion resistance such as fire bricks, it is imperative that the impurities contained in the magnesium oxide for using as a material is low. For example, in the case of using magnesium oxide as a material for fire bricks, it is required to reduce calcium to a level of about 1 to 2% or less.

However, it is difficult to obtain a large amount of such magnesium oxide being low in impurity content and high in purity from natural ores such as magnesite. Accordingly, a desired oxide was often obtained by converting magnesium obtained by leach of an ore by the addition of an acid into a hydroxide or a carbonate, and then roasting it. For this reason, the ability to produce magnesium oxide is limited and magnesium oxide is very expensive.

On the other hand, it is also known that ores containing magnesium are present together with nickel oxide ore. In conventional smelting of nickel oxide ore, pyrometallurgy has often been used in which an oxide ore is put into a furnace together with a reductant and then roasted to afford nickel metal or a sulfide. However, it was not possible to use pyrometallurgy effectively because magnesium is allowed thereby to form an oxide together with impurities and is separated as a slug.

In recent years, hydrometallurgy called HPAL process, in which nickel oxide ore is leached under high temperature and pressure conditions by using sulfuric acid, has also been used. In an HPAL process, nickel oxide ore is put into a pressurizable vessel together with sulfuric acid and then polyvalent metal such as nickel is leached into a sulfuric acid solution under high temperature and pressure atmosphere at about 250° C. It is characteristic in that use of the HPAL process makes it possible to leach nickel at a high efficiency from low quality nickel oxide ore containing nickel in a content of about 1 to about 2% by mass or less.

The leached nickel is solid-liquid separated from a slurry containing a leach residue with continuous addition of a neutralizing agent and then is separated from impurities by addition of a neutralizing agent as described in Patent Literature 1. Moreover, the leached nickel forms a precipitate of a sulfide by the addition of a sulfidizing agent and is separated from components which are not intended to be recovered, such as aluminum, manganese, and magnesium, and thereby is refined into an intermediate material for obtaining nickel metal or a nickel salt.

On the other hand, the solution resulting from the separation of nickel and containing components which are not intended to be recovered is transferred to effluent treatment and then discharged via treatments such as neutralization. In other words, magnesium was not effectively utilized as a resource even in the HPAL process of Patent Literature 1.

While limestone, calcium hydroxide, or the like of high industrial availability is used in a large amount as a neutralizing agent in smelting using a wet process described above, calcium sulfate formed by neutralization also forms a precipitate. This led to increase in the amount of the precipitate and raised such problems as increase in labor required for securing a disposal place, in disposal costs, and besides, increase in environmental impact.

Use of a highly soluble salt as a neutralizing agent is conceivable as a method for inhibiting the amount of a precipitate from being increased by a neutralizing agent, and the above-described magnesium oxide and magnesium salts such as magnesium hydroxide are suitable for this application. For this reason, in hydrometallurgy for nickel oxide ore, attempts have also been made to recover magnesium from waste water generated in steps and use magnesium oxide as a neutralizing agent.

Specifically, one example of the methods for recovering magnesium from a solution to be transferred to effluent treatment is the method described in Patent Literature 2. In Patent Literature 2 is proposed a process of recovering magnesium oxide from a source of magnesium sulfate, said process including the steps of: providing a source of magnesium sulfate in solution that is derived from part of a process associated with the leaching of a metal containing ore or concentrate; converting the magnesium sulfate in solution into solid magnesium sulfate; contacting the solid magnesium sulfate with elemental sulfur in a reducing atmosphere; and recovering the magnesium as magnesium oxide, and the sulfur as sulfur dioxide gas.

In Patent Literature 3 is proposed an atmospheric leach process in the recovery of nickel and cobalt from lateritic ores, said processing including the steps of: separating the lateritic ore into a low magnesium containing ore fraction, and a high magnesium containing ore fraction by selective mining or post mining classification; separately slurrying the separated ore fractions; leaching the low magnesium containing ore fraction with concentrated sulfuric acid as a primary leach step; and introducing the high magnesium content ore slurry following substantial completion of the primary leach step and precipitating iron as goethite or another low sulfur containing form of iron oxide or iron hydroxide, wherein sulfuric acid released during iron precipitation is used to leach the high magnesium ore fraction as a secondary leach step.

It is expected that the use of the methods described in Patent Literatures 2 and 3 makes it possible to use magnesium contained in nickel oxide ore as a neutralizing agent or to recover magnesium from a neutralized liquid and iteratively use it as a neutralizing agent.

In the case of using these methods, however, a huge amount of heat energy is required for concentrating magnesium from a large amount of waste water and there is a concern that impurities contained in ores accumulate in the process with iterative use of a neutralizing agent.

Moreover, normally, the content of magnesium contained varies and is not stable depending upon the type, mine site, and mine time of ores. For this reason, if magnesium is insufficient, combined use of a conventional calcium-based neutralizing agent that is inexpensive and capable of being supplied stably, such as calcium hydroxide, limestone, or the like, is conceivable. In this case, however, calcium is also brought into the process and is circulated within the process as in the above-described conventional methods. Moreover, an attempt to recover magnesium from waste water will result in failure of magnesium to be used for applications other than a neutralizing agent because some calcium behaves in the same manner as magnesium.

Examples of methods for separating magnesium and calcium in a solution from each other include the method described in Patent Literature 4. In the method described in Patent Literature 4, magnesium hydroxide is recovered from waste fluid containing a large amount of magnesium sulfate disposed and discharged in a flue gas desulfurization plant in which magnesium hydroxide is used as a desulfurizing agent and is recycled to a flue gas desulfurization step. Thus, the method is conducive to recycling and environmental cleanup. Specifically, ammonia is added to flue gas desulfurization waste water containing magnesium sulfate to form and settle magnesium hydroxide, and then lime milk is added to the resulting liquid to form calcium sulfate and ammonia and the ammonia is circulated between steps. If the thus-obtained magnesium hydroxide is slurried with the final waste fluid of the present process and circulated to a desulfurization plant, then perfect circulation of desulfurization plant waste water is realized and it becomes possible to eliminate disposal and discharge of waste water. Moreover, the resulting calcium sulfate can enhance advantage in its external sale by providing a washing step to increase its purity.

However, since ammonia is handled in the method of Patent Literature 4, there are problems with the method that a complicated facility is required and that investments and operating costs are increased. Therefore, it was difficult to handle it easily.

As described above, it was not easy to obtain magnesium oxide being low in impurity content and high in purity efficiently at a low cost by such conventional methods.

CITATION LIST

Patent Literatures

Patent Literature 1: JP 2005-350766 A
Patent Literature 2: JP 2009-520661 T
Patent Literature 3: JP 2005-523996 T
Patent Literature 4: JP 2000-93739 A
Patent Literature 5: US 2011/0110832 A

SUMMARY OF INVENTION

Technical Problem

The present invention has been proposed in view of such situations, and it is an object thereof to provide a method for producing magnesium oxide by which magnesium oxide being high in purity and low in impurity content can be produced simply and efficiently from a sulfuric acid solution containing magnesium and calcium such as waste water.

Solution to Problem

A first invention for solving the above-described problems is a method for producing magnesium oxide by which magnesium oxide is produced from a sulfuric acid solution containing magnesium and calcium, the method including: a calcium separation step of precipitating as calcium sulfate and separating the calcium contained in the sulfuric acid solution by concentrating the sulfuric acid solution; a magnesium crystallization step of precipitating as magnesium sulfate and separating the magnesium contained in the solution obtained via the calcium separation step by further concentrating the solution; a roasting step of obtaining magnesium oxide and sulfur dioxide by roasting the magnesium sulfate separated in the magnesium crystallization step together with a reductant; and a step of washing the magnesium oxide obtained in the roasting step.

A second invention is characterized in that in the first invention, the time at which the specific gravity of the concentrated solution arrives at 1.2 $g/cm^3$ is taken as the endpoint of the calcium separation step.

A third invention is characterized in that in the first or second invention, the concentration of a solution in the calcium separation step and that in the magnesium crystallization step are performed by natural drying.

A fourth invention is characterized in that in any one of the first to third inventions, the filtrate obtained by adding a neutralizing agent to the sulfuric acid solution containing magnesium and calcium to adjust the solution to pH 7.0 to 8.5 and then performing solid-liquid separation is used for the calcium separation step.

A fifth invention is characterized in that in any one of the first to fourth inventions, one or more members selected from among coke, coal, charcoal, bamboo coal and spent activated carbon is used as the reductant in the roasting step.

A sixth invention is characterized in that in any one of the first to fifth inventions, the sulfuric acid solution containing magnesium and calcium is obtained by subjecting to effluent treatment of a solution resulting from leaching nickel oxide ore with sulfuric acid under high temperature and pressure conditions, adding a neutralizing agent containing calcium and/or magnesium to the resulting leachate containing nickel to remove impurities, and subsequently adding a sulfidizing agent to precipitate and separate nickel.

A seventh invention is characterized in that in the sixth invention, the sulfur dioxide generated in the roasting step is converted into sulfuric acid and the resulting sulfuric acid is iteratively used for the leaching of the nickel oxide ore as the sulfuric acid under high temperature and pressure conditions.

Advantageous Effects of Invention

According to the present invention, magnesium oxide being high in purity and low in impurity content can be produced simply and efficiently from a sulfuric acid solution containing magnesium and calcium such as waste water. Magnesium oxide with such a high purity can be used suitably for materials for alloys and fire bricks that constitute furnaces.

Moreover, the application of the present invention to a leachate obtained by hydrometallurgy using an HPAL process of nickel oxide ore can reduce residues generated during the HPAL process and makes it possible to iteratively use a neutralizing agent, sulfuric acid, etc. for the process and thereby reduce the novel use amount of these materials, and can perform efficient treatment.

DESCRIPTION OF EMBODIMENTS

Specific embodiments of a method for producing magnesium oxide of the present invention (hereinafter referred to as the present embodiments) are described in detail in the following order with reference to the accompanying drawings. The present invention is not limited to the following embodiment and may be modified appropriately unless the gist of the present invention is changed.
1. Summary of a method for producing magnesium oxide
2. Steps of a method for producing magnesium oxide
   2-1. Calcium separation step
   2-2. Magnesium crystallization step
   2-3. Roasting step
   2-4. Washing step
3. Method for producing magnesium oxide based on hydrometallurgy for nickel oxide ore
   3-1. HPAL process for nickel oxide ore
   3-2. Effluent treatment step
   3-3. Process of producing magnesium oxide
   3-4. Sulfuric acid production step
4. Examples 1. Summary of a Method for Producing Magnesium Oxide The method for producing magnesium oxide according to the present embodiment is, for example, a method for producing magnesium oxide being high in purity and low in impurity content from a sulfuric acid solution containing magnesium and calcium that is obtained from a solution resulting from separation and recovery of nickel in hydrometallurgy, such as an HPAL process, of nickel oxide ore.

Figure 1:
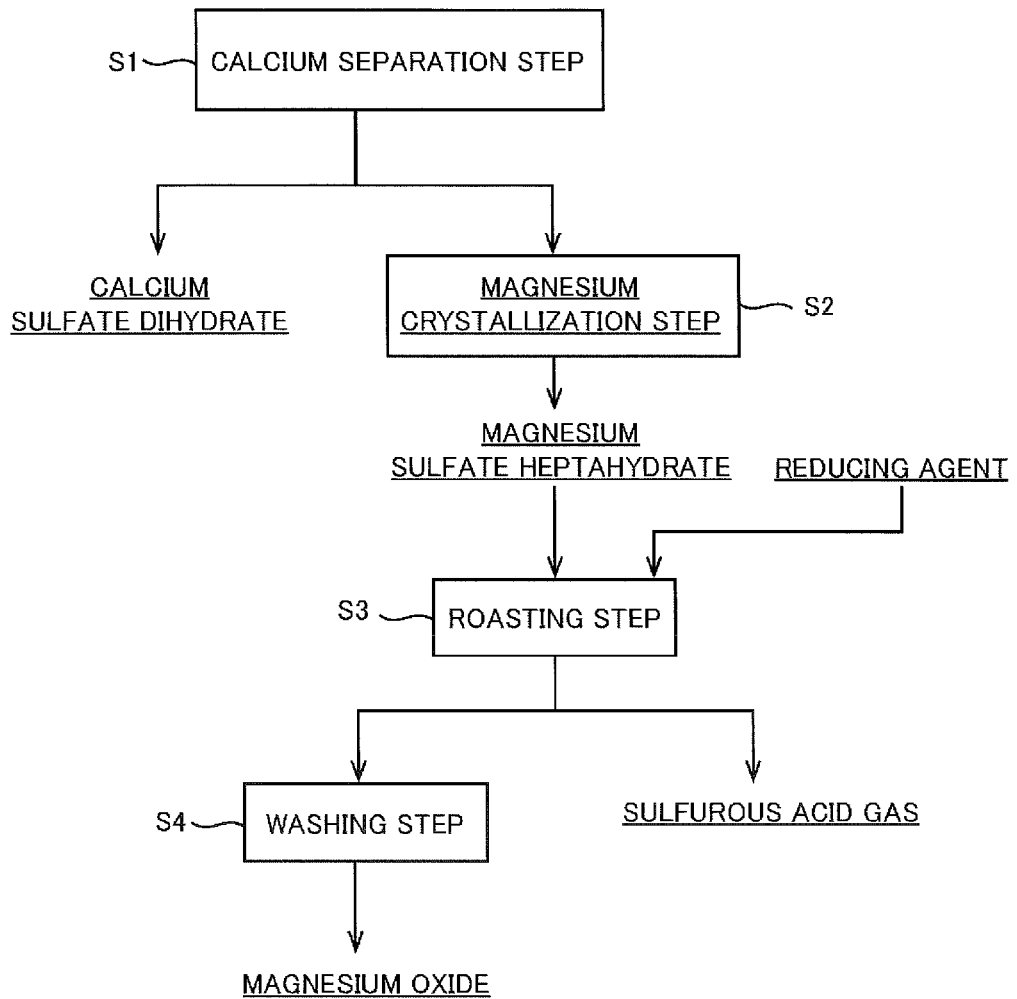
FIG. 1 is a process diagram showing the flow of a method for producing magnesium oxide.

Specifically, as shown in the process diagram of FIG. 1, the method for producing magnesium oxide according to the present embodiment includes a calcium separation step S1 of concentrating a sulfuric acid solution containing magnesium and calcium to precipitate the calcium contained in the sulfuric acid solution into the form of calcium sulfate and then separating it, a magnesium crystallization step S2 of separating the magnesium contained in the solution obtained via the calcium separation step S1 by further concentrating the solution to precipitate the magnesium as magnesium sulfate, a roasting step S3 of obtaining magnesium oxide and sulfur dioxide by roasting the resulting magnesium sulfate together with a reductant, and a washing step S4 of washing the magnesium oxide obtained in the roasting step S3.

In the present embodiment, a sulfuric acid solution containing magnesium and calcium is concentrated in two steps and thereby magnesium and calcium are separated as described above. In other words, calcium is first precipitated as salt crystals in the form of calcium sulfate dihydrate and then separated and subsequently magnesium is precipitated as salt crystals in the form of magnesium sulfate heptahydrate and then separated. Subsequently, the resulting crystals of magnesium sulfate heptahydrate are roasted together with a reductant such as coke and charcoal to form magnesium oxide, which is then further washed to afford magnesium oxide with high purity.

According to this method for producing magnesium oxide, magnesium oxide being high in purity and low in impurity content can be produced simply and efficiently from a solution containing magnesium and calcium such as waste water. Since the magnesium oxide to be obtained by this method is low in impurity content and high in purity, it can be used suitably for fire bricks that constitute electric furnaces and materials for alloys.

Moreover, the application of the production method to a leachate obtained by hydrometallurgy using an HPAL process using nickel oxide ore as a raw material can reduce residues generated during the HPAL process and makes it possible to iteratively use a neutralizing agent, sulfuric acid, etc. for the process. This allows the novel use amount of these chemicals to be reduced and makes it possible to perform efficient operations.

In the following, individual steps of the method for producing magnesium oxide are described in detail.

2. Individual Steps of the Method for Producing Magnesium Oxide 2-1. Calcium Separation Step In calcium separation step S1, a sulfuric acid solution containing magnesium and calcium is concentrated and the calcium contained in the sulfuric acid solution is thereby precipitated as calcium sulfate and separated. This calcium separation step S1 serves as a step of performing the first concentrate separation.

The sulfuric acid solution to be concentrated is a sulfuric acid solution containing magnesium and calcium, and waste water and the like previously discarded in such treatment as metal refinery can be used. Preferably, a sulfuric acid solution including such waste water or the like is adjusted to pH 7.0 to 8.5 by the addition of a neutralizing agent, followed by solid-liquid separation, and the resulting filtrate is used. The use of a sulfuric acid solution obtained by subjecting a solution including waste water or the like to effluent treatment can increase the purity of crystals and makes it possible to produce magnesium oxide with higher quality.

The concentrate separation treatment in the calcium separation step S1 utilizes the fact that the solubility of calcium sulfate dihydrate is smaller than the solubility of magnesium sulfate heptahydrate and therefore calcium sulfate dihydrate precipitates preferentially over magnesium sulfate heptahydrate in a concentration process. The calcium contained in the sulfuric acid solution is thereby selectively separated.

The size of the calcium sulfate crystals to be precipitated is not particularly limited and is not determined unconditionally and may be chosen appropriately according to the productivity of concentration and the degree of impurity separation which are found through tests previously carried out.

The method for concentrating a sulfuric acid solution is not particularly limited as long as it can precipitate crystals of calcium by vaporizing the moisture contained in the sulfuric acid solution, and various methods can be used. Examples thereof include commonly performed methods of externally applying heat using petroleum, electric power or the like.

Among such various methods, it is particularly preferred to use a method of concentrating the solution by natural drying (sun drying) using natural energy such as solar heat, geothermal heat, wind, or the like.

Specifically, various methods such as a method of putting a sulfuric acid solution to be concentrated, such as waste water, in a container and leaving it outdoors to sun dry, or as conventionally used in a flow down type saltern, a method of dropping a sulfuric acid solution on a branch rack braided of bamboo or vinyl and collecting grown crystals can be utilized as a method for performing concentration by natural drying.

Preferably, the suitable concentration treatment for the calcium separation in the calcium separation step S1 is carried out within a range where precipitation of calcium sulfate dihydrate is found but precipitation of magnesium sulfate heptahydrate is not found as much as possible. The range can be specified by various methods such as a method of analyzing the components of the solution, a method of observing the difference in the appearance of the solution viewed by the eyes, or a method of measuring the specific gravity of the solution.

Especially, according to a method of judging the degree of concentration treatment, i.e., the endpoint of the concentration treatment, by measurement of specific gravity, calcium can be effectively separated and removed by a simple method. Specifically, the present inventor found that when a sulfuric acid solution is concentrated slowly by natural drying, the range of the specific gravity of the solution of from 1.1 to 1.3 g/cm$^3$ borders, and if the specific gravity is smaller than this range, crystallization of calcium sulfate occurs, whereas if the specific gravity becomes greater than that range with the progress of concentration, crystallization of magnesium sulfate starts gradually.

For example, in the case of waste water including a sulfuric acid solution with a magnesium concentration of about 5 g/l and a calcium concentration of about 0.5 g/l discharged via an HPAL process, 80 to 90% or more of the calcium contained in the solution can be efficiently separated and removed while the concentration arriving at the above-mentioned specific gravity.

Accordingly, in the calcium separation step S1, calcium can be effectively separated at a high ratio by a simple method by measuring the specific gravity of the sulfuric acid solution and then judging the time when the specific gravity becomes about 1.1 to 1.3 g/cm$^3$, more preferably about 1.2 g/cm$^3$, as being the endpoint of the concentration treatment.

The solid-liquid separation of the crystals of crystallized calcium sulfate and a solution can be carried out by using a filtering device, a centrifugal separator, or the like. In the case that the crystallized grains are coarse, solid-liquid separation is allowed to proceed more quickly by the use of such an apparatus and only a compact facility is required. Moreover, that case affords a small amount of moisture attached to crystals, resulting in advantage in quality.

2-2. Magnesium Crystallization Step

In the magnesium crystallization step S2, the solution obtained via the calcium separation step S1 is further concentrated, and the magnesium contained in the solution is precipitated as crystals of magnesium sulfate heptahydrate and then taken out. This magnesium crystallization step S2 serves as a step of performing the second concentrate separation.

Various methods can be used as the condensation method in the magnesium crystallization step S2 like the concentration method in the above-described condensation method in the calcium separation step S1, and it is particularly preferred to use a method of concentrating the solution by natural drying (sun drying) using natural energy such as solar heat, geothermal heat, wind, or the like.

Here, as in the above-described calcium separation step S1, when concentration by natural drying is carried out as the concentration method in the magnesium crystallization step S2, then this method requires more time than a concentration method by external heating using petroleum, electric power, or the like and therefore is conceivable to be inefficient. However, since, for example, waste water (sulfuric acid solution) generated by hydrometallurgy method of nickel oxide ore contains magnesium in an amount of about 10 to about 20 g/l, magnesium can be concentrated far efficiently as compared with sea water, which contains magnesium as little as about 1.3 g/l.

In addition, since drying using natural energy allows moisture to vaporize slowly, such drying makes it possible to delicately manage the state of a solution under vaporization. Moreover, since crystals of the salt to be precipitated grow coarsely, impurities that are not intended to be recovered, such as aluminum, are inhibited from entering into the gap between crystal grains of magnesium sulfate, so that crystals with little impurities can be obtained.

Figure 2A:
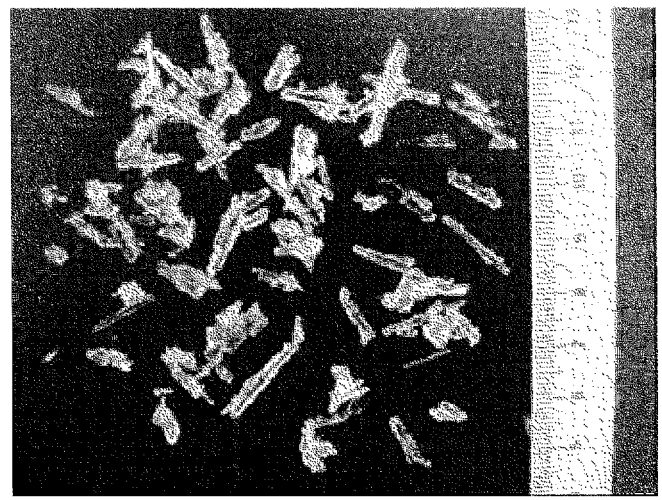
FIG. 2(A) is a photograph showing the crystal state of magnesium sulfate formed via concentration treatment by natural drying (sun drying) and FIG. 2(B) is a photograph showing the crystal state of magnesium sulfate formed via concentration treatment by external heating.
Figure 2B:
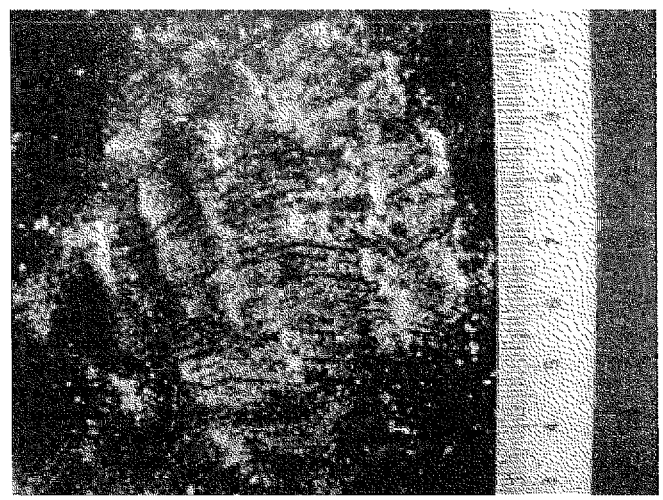

FIG. 2(A) is a photograph showing the crystal state in the case that crystals of magnesium sulfate are precipitated by performing concentration treatment by natural drying (sun drying) the solution by leaving it outdoors in the magnesium crystallization step S2. On the other hand, FIG. 2(B) is a photograph showing the crystal state in the case that crystals of magnesium sulfate are formed by performing concentration treatment by vaporizing moisture with a water bath heated to 80° C. with external electric power. As can be seen in the photograph of FIGS. 2(A) and 2(B), precipitating crystals of magnesium sulfate by concentration treatment by natural drying can form crystals far larger than those to be formed in the case of crystallizing a solution by vaporizing moisture by external heating As described above, in the magnesium crystallization step S2, magnesium sulfate in the form of coarse crystal grains can be precipitated and recovered efficiently by, for example, concentrating a solution at a low drying rate using natural drying to precipitate crystals. In addition, growing large crystals makes it possible to reduce a calcium component that is to attach to the surface of crystals or a calcium component that is to coprecipitate to be contained in crystals of magnesium. Moreover, the capability of forming such coarse crystals can inhibit crystals from scattering to become dusts and result in recovery loss in the reductive roasting in the following roasting step S3.

In the concentration treatment, by keeping crystals of magnesium sulfate as seeds immersed in a solution, the crystals serve as nuclei to cause precipitation of magnesium sulfate crystals, so that coarser crystals can be obtained efficiently.

The endpoint of the concentration treatment in the magnesium crystallization step S2 can be determined arbitrarily. The solid-liquid separation of the precipitated magnesium sulfate crystals and the solution can be carried out by using a filtering device, a centrifugal separator, or the like as in the calcium separation step S1.

Although drying is advanced slowly by taking, for example, several days or several weeks in natural drying (sun drying), it is difficult to uniformly determine the drying rate, namely, the required drying time with respect to the amount of liquid because there are factors including humidity, temperature, and so on. Therefore, it is preferred to determine the drying rate appropriately according to such various factors.

Although vaporization may be promoted by heating if the drying rate is similar to that in natural drying, it may become very inefficient than natural drying. When the magnesium concentration in a solution is low, a method of concentrating the solution to some extent using a water bath or the like and then performing natural drying may be used in order to shorten the drying time.

2-3. Roasting Step

In the roasting step S3, the magnesium sulfate obtained in the magnesium crystallization step S2 is roasted together with a reductant, so that magnesium oxide and sulfur dioxide are obtained.

In the roasting step S3, a reaction in which magnesium sulfate is reductively decomposed to form magnesium oxide, sulfur dioxide, and water occurs as shown in the following formula (1), for example.

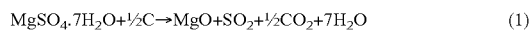

$$MgSO_4 \cdot 7H_2O + \tfrac{1}{2}C \rightarrow MgO + SO_2 + \tfrac{1}{2}CO_2 + 7H_2O \qquad (1)$$

As the reductant to be used in the roasting step S3, coke, for example, can be used as shown in the above formula (1), and carbon-based reductants such as coal, charcoal, bamboo coal, spent activated carbon can also be used. Propane gas, liquefied petroleum gas (LPG), etc. may also be used as the reductant. Among these, charcoal, bamboo coal, and the like are renewable energy and therefore particularly excellent in an environmental aspect.

Although use of sulfur as a reductant is also permissible, it is undesirable because retention of sulfur in attempting to obtain magnesium oxide with high purity will cause necessity to detoxify exhaust gas in use of magnesium oxide and it may affect the quality of an end product.

While the equivalent of a reductant can be chosen by performing a test beforehand, 1 equivalent is a little small in the case of coke and it is desirable to add it in about 2 equivalent.

Conditions to be used in reductive roasting treatment are not particularly limited and may be chosen appropriately according to the amount of magnesium, the type of a reductant, the apparatus to be used, and so on. For example, when roasting is performed by using coke as a reductant and also by using a rotary kiln, it is desirable to adjust the additive amount of the reductant to 0.5 mol/mol or more, which corresponds to 2 equivalents relative to magnesium, the reaction temperature to about 950 to about 1100° C., and the retention time to about 1 to about 5 hours.

2-4. Washing Step

In the washing step S4, the magnesium oxide obtained in the roasting step S3 is washed. While the magnesium oxide formed in the roasting step S3 can be used as it is for such applications as a neutralizing agent, it can be increased in the purity of magnesium oxide by applying washing treatment.

Water can be used for the washing treatment in the washing step S4. The solubility in water of magnesium oxide is 0.0086 g/100 ml at 20° C. Therefore, it is possible to separate a substance having a solubility higher than the solubility in water of magnesium oxide by the washing with water in the washing step S4 and it is possible to increase the purity of magnesium oxide.

More specifically, in the case of calcium sulfate, the solubility in 20° C. water of calcium sulfate anhydrate is 0.24 g/100 ml, which is far higher than the solubility at 20° C. of magnesium oxide. For this reason, it becomes possible to separate, by the washing treatment in the washing step S4, the calcium that failed to be separated by the two-step concentration treatment composed of the above-described calcium separation step S1 and the magnesium crystallization step S2 and magnesium oxide with high purity can be obtained.

As described above, in the method for magnesium oxide producing according to the present embodiment, concentration treatment is performed in two steps, namely, calcium is first precipitated and removed as crystals of calcium sulfate from a sulfuric acid solution containing magnesium and calcium and then magnesium is precipitated and removed as crystals of magnesium sulfate from the solution resulting from the separation and removal of calcium. Subsequently, the resulting crystals of magnesium sulfate heptahydrate are roasted together with a reductant to form magnesium oxide and the magnesium oxide is further washed to afford magnesium oxide with high purity.

According to such a method for producing magnesium oxide, magnesium oxide being high in purity and low in impurity content can be produced efficiently via simple operations from a sulfuric acid solution containing magnesium and calcium such as waste water. The product can thereby be used suitably for fire bricks that constitute electric furnaces and materials for alloys, for example.

3. Method for Producing Magnesium Oxide Based on Hydrometallurgy for Nickel Oxide Ore A leachate containing nickel obtained via an HPAL process including leaching nickel oxide ore with sulfuric acid under high temperature and pressure conditions can be used as the sulfuric acid solution containing magnesium and calcium to be used in the above-described method for producing magnesium oxide. More specifically, there can be used a product that has resulted from effluent treatment of a solution obtained by adding a neutralizing agent containing calcium and/or magnesium to a leachate containing nickel afforded by the leaching of nickel oxide ore by a high temperature and pressure leach method (HPAL process) to separate impurities, and subsequently adding a sulfidizing agent to precipitate and separate a mixed sulfide of nickel and cobalt.

Figure 3:
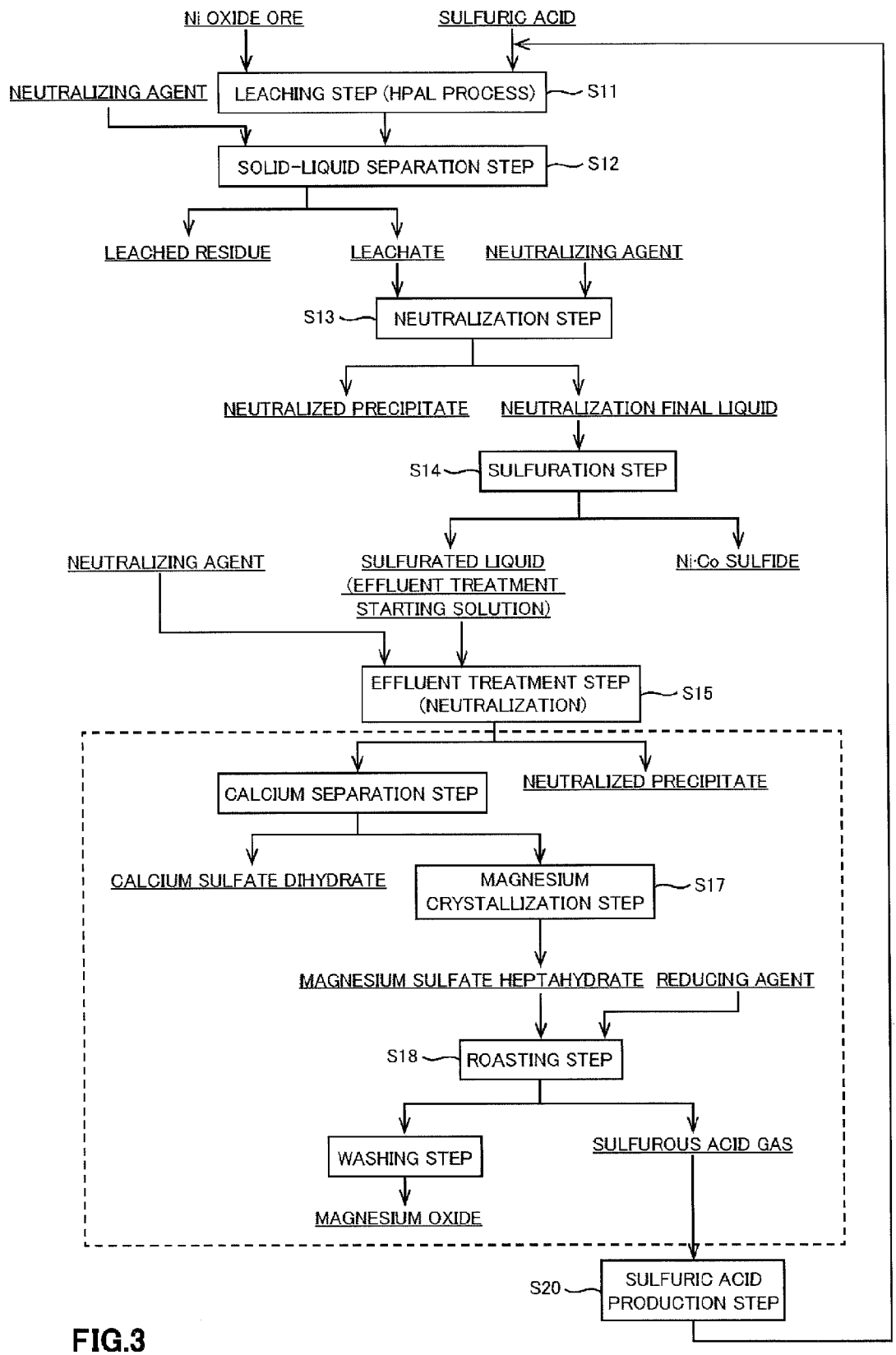
FIG. 3 is a process diagram showing the flow of a method for producing magnesium oxide based on hydrometallurgy for nickel oxide ore.

FIG. 3 is a process diagram showing a series of treatment in the case of applying the above-described method for producing magnesium oxide using a solution obtained by separating a nickel-cobalt mixed sulfide by hydrometallurgy for nickel oxide ore using an HPAL method.

3-1. HPAL Process for Nickel Oxide Ore

First, the hydrometallurgy for nickel oxide ore using an HPAL method includes a leaching step S11 of adding sulfuric acid to a slurry of nickel oxide ore to leach the ore under high temperature and pressure conditions, a solid-liquid separation step S12 of separating a leach residue while washing the leach slurry in multi-stages to obtain a leachate containing impurity elements as well as nickel and cobalt, a neutralization step S13 of adjusting the pH of the leachate to separate a neutralized precipitate containing the impurity elements and obtain a neutralization final liquid containing zinc as well as nickel and cobalt, and a sulfurization step S14 of subjecting the neutralization final liquid to sulfurization treatment to form a mixed sulfide containing nickel and cobalt.

In the leaching step S11, sulfuric acid is added to a slurry of nickel oxide ore by using an autoclave or the like, followed by stirring at a temperature of 220 to 280° C., to form a leach slurry composed of a leach residue and a leachate.

Examples of the nickel oxide ore include so-called lateritic ores, mainly including limonite ore and saprolite ore. The nickel content of limonite ore is usually 0.8 to 2.5% by weight and nickel is contained in the form of a hydroxide or a silicomagnesian (magnesium silicate) mineral. The content of iron is 10 to 50% by weight. Iron is mainly in the form of a trivalent hydroxide (goethite) and some divalent iron is contained in a silicomagnesian mineral. In the leaching step S11, in addition to such lateritic ores, oxide ores containing polyvalent metals, such as nickel, cobalt, manganese, and copper, for example, manganese nodules deposited on a deep sea bed, may be used.

In the solid-liquid separation step S12, the leach slurry formed in the leaching step S11 is washed in multi-stages to obtain a leachate containing nickel and cobalt and a leach residue.

In the neutralization step S13, a neutralizing agent such as magnesium oxide or calcium carbonate is added so that pH may be 4 or less while the oxidation of the leachate is inhibited, and thus a neutralized precipitate slurry containing trivalent iron and a mother liquor for nickel recover are formed.

In the sulfurization step S14, hydrogen sulfide gas is blown into the mother liquor for nickel recovery to form a sulfide containing nickel and cobalt (nickel-cobalt mixed sulfide) with low impurity components and a barren liquid (sulfurated liquid) with a stabilized nickel concentration kept at a low level. When zinc is contained in the mother liquor for nickel recovery, zinc may be selectively separated in the form of sulfide prior to separation of nickel and cobalt in the form of sulfide.

In this sulfurization step S14, a slurry of a nickel-cobalt mixed sulfide is subjected to precipitation separation treatment by the use of a precipitating and separating device such as a thickener or the like, so that the nickel-cobalt mixed sulfide is separated and recovered from the bottom of the thickener, while the aqueous solution component is overflowed and recovered as a sulfurated liquid. The sulfurated liquid is a sulfuric acid solution containing magnesium, calcium and so on remaining unsulfurated. Accordingly, magnesium oxide with high purity can be obtained by applying the above-described method for producing magnesium oxide using the sulfurated liquid.

In using the sulfurated liquid obtained in the sulfurization step S14 as a raw material for the method for producing magnesium oxide, it is preferred to remove impurities contained in the sulfuric acid solution as much as possible. In other words, impurities such as metals or heavy metals, e.g., iron and aluminum, in addition to magnesium and calcium are contained in a sulfurated liquid obtained via the sulfurization step S14 in the hydrometallurgy for nickel oxide ore. For this reason, it is desirable to remove such impurities before performing a method for producing magnesium oxide using the resulting solution. Therefore, the effluent treatment step S15 described below is the performed using the sulfurated liquid obtained in the sulfurization step S14.

3-2. Effluent Treatment Step

In the effluent treatment step S15, a neutralizing agent is added to the sulfurated solution resulting from the sulfurization step S14 (effluent treatment starting solution) to adjust its pH, so that a neutralized precipitate containing impurities such as iron, aluminum, and heavy metals is formed. This allows the impurities to be removed from the sulfuric acid solution and reduces the impurity content in crystals to be formed in the magnesium oxide production to be carried out subsequently, and thereby makes it possible to produce magnesium oxide with a high purity.

Specifically, for example, the addition of a neutralizing agent to a sulfurated solution adjusts the solution to pH 7.0 to 8.5, so that a neutralized precipitate and an effluent treatment finished solution are solid-liquid separated.

Then, the above-described method for producing magnesium oxide is performed with the sulfuric acid solution containing magnesium and calcium (the effluent treatment finished solution), which was obtained via the sulfurization step S14 of the method of hydrometallurgy for nickel oxide ore and from which impurities were removed in the effluent treatment step S15 as described above.

3-3. Process of Producing Magnesium Oxide

In other words, a calcium separation step S16 of concentrating the sulfuric acid solution containing magnesium and calcium based on the sulfurated solution to precipitate and separate calcium as calcium sulfate, a magnesium crystallization step S17 of further concentrating the resulting solution to precipitate and separate magnesium as magnesium sulfate, a roasting step S18 of roasting crystals of the separated magnesium sulfate together with a reductant to obtain magnesium oxide and sulfur dioxide, and a washing step S19 of washing the magnesium oxide obtained via the roasting are carried out. Since the individual steps are the same as those described above, their detailed explanation is omitted.

As described above, magnesium oxide can be produced efficiently in high purity by this method for producing magnesium oxide from a sulfurated liquid obtained in the sulfurization step S14 in the hydrometallurgy for nickel oxide ore.

Production of magnesium oxide based on the hydrometallurgy for nickel oxide ore using an HPAL method can reduce residues generated during the HPAL process and makes it possible to iteratively use the produced magnesium oxide as a neutralizing agent to be used for the process. This can reduce the novel use amount of a neutralizing agent and makes it possible to perform efficient operation in terms of operation cost and so on.

3-4. Sulfuric Acid Production Step

In the method for producing magnesium oxide, magnesium oxide is obtained and simultaneously sulfur dioxide ($SO_2$) is generated in the roasting step S18 by reductively roasting magnesium sulfate as shown in the above formula (1). The sulfur dioxide generated is not allowed to be emitted to the air as it is. On the other hand, sulfur dioxide can be used effectively because it can serve as a raw material for sulfuric acid. Thus, a sulfuric acid production step S20 of capturing the sulfur dioxide generated and converting it into sulfuric acid can be performed.

In the sulfuric acid production step S20, the sulfur dioxide resulting via the roasting step S18 is captured and thereby sulfuric acid is produced. The method of producing sulfuric acid is not particularly limited and a publicly known method may be used.

Capturing sulfur dioxide in the sulfuric acid production step S20 and thereby producing sulfuric acid as described above make it possible to reuse the produced sulfuric acid as the sulfuric acid to be used in the leaching step S11 of the above-described method of hydrometallurgy for nickel oxide ore. This can reduce the amount of the sulfuric acid to be newly prepared and makes thereby it possible to reduce the operation cost and operate more efficiently. Moreover, it can reduce the waste volume, so that it can reduce a load on the environment significantly.

4. EXAMPLES

Examples of the present invention are described below, but the invention is not limited to the following examples.

Examples

Example 1

Separation of Calcium Sulfate and Crystallization of Magnesium Sulfate

Calcium sulfate dihydrate and magnesium sulfate heptahydrate were dissolved in pure water to prepare 300 ml of an aqueous solution whose magnesium concentration was adjusted to be 25 g/l and calcium concentration was adjusted to be 0.5 g/l. This solution was divided into three equal portions as samples 1 to 3 in beakers with a volume of 200 ml.

Then, a water bath kept at 70° C. was prepared in a fume chamber and Samples 1 to 3 were heated, thereby allowing water to vaporize. Thus, the solutions were concentrated. The concentration of the solutions was performed by placing the solutions initially in a water bath at 70° C. to vaporize water of an appropriate amount so much as to allow no crystals to precipitate, and then spontaneously vaporizing water under accurate measurement of the amount of evaporation by maintaining the solutions at 30° C. while keeping the solutions in the water bath. After maintaining for 2 to 5 hours, precipitation of crystals was found. For each of the samples, the amount of the crystals and the amount of the liquid resulting from removing the crystals by filtration were measured and the respective metal ion concentrations were analyzed by ICP. Table 1 given below shows the analytical results for the respective samples.

TABLE 1

|  | Sample 1 | Sample 2 | Sample 3 |
|---|---|---|---|
| Amount of liquid vaporized (ml) | 40 | 51 | 60 |
| Amount of crystals precipitated after drying (mg) | 40 | 50 | 200 |
| Amount of filtrate (ml) | 57 | 46 | 36 |
| Mg concentration in filtrate (g/l) | 44 | 55 | 64 |
| Ca concentration in filtrate (g/l) | 0.85 | 0.90 | 0.48 |
| Ca removal percentage (%) | 3 | 18 | 65 |
| Specific gravity | 1.19 | 1.25 | 1.28 |
| Distribution of Mg to filtrate (%) | 99.5 | 99.3 | 92.8 |

As shown in Table 1, it is seen that the amount of the crystals precipitated increases as the amount of the liquid vaporized increases. From an analyzed value determined using ICP, the amount of calcium remaining in a solution (a filtrate) was calculated and then the retention percentage and the removal percentage of calcium were calculated. As a result, as to the retention percentage and the removal percentage of calcium, 3% to 65% of the calcium contained in the initial filtrate was precipitated successfully in the form of crystals of calcium sulfate dihydrate while 99.5% to 92.8% of the magnesium contained in the initial filtrate was allowed to remain.

Figure 4:
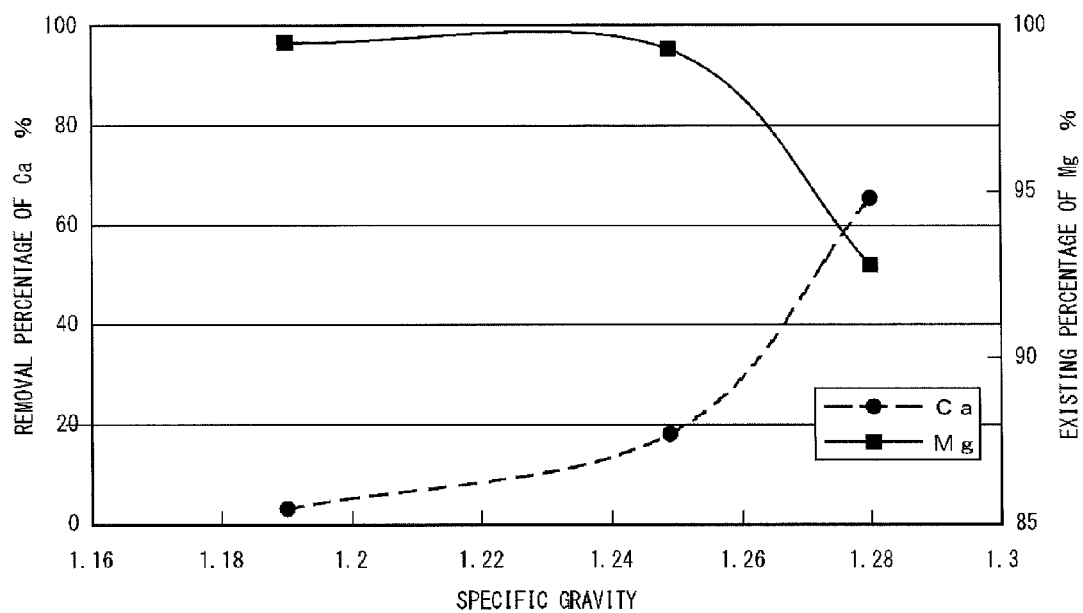
FIG. 4 is a graph showing the removal percentage of calcium and the existing percentage of magnesium in a solution with respect to the specific gravity of the solution.

FIG. 4 is a graph showing the removal percentage of calcium and the existing percentage of magnesium in a solution with respect to the specific gravity of the solution. From the graph of FIG. 4, it is seen that by completing concentration treatment for calcium separation at the time when the specific gravity of a solution arrives especially at about 1.2 g/cm$^3$, crystals of calcium can be precipitated and separated effectively while the retention of magnesium in the solution is kept high.

Subsequently, using a solution with the same degree of concentration as Sample 3, concentration was further continued. In other words, concentration was continued by spontaneous vaporization to crystallize the magnesium in the solution. As a result, following the precipitation of calcium sulfate dihydrate, crystals of magnesium sulfate heptahydrate started to precipitate and could be separated from the solution. Calculating on the basis of the analytical values, the amount of magnesium sulfate heptahydrate was 0.05 mol and the amount of calcium sulfate dihydrate was 0.005 mol (Mg:Ca=10:1).

Moreover, in order to investigate the influence of particle size on crystal quality in crystallizing magnesium from a solution concentrated like Samples 1 to 3, a solution (mimic liquid after concentration) having a magnesium concentration of 25 g/l and a calcium concentration of 0.5 g/l was prepared by using reagents of magnesium sulfate heptahydrate and calcium sulfate dihydrate, and 200 ml portions of the solution were taken out. One was natural dried (sun dried) by exposure to the open air, affording crystals having a larger particle size (see FIG. 2 (A)). The other was heated at 80° C. on a water bath and then cooled to 30° C., affording crystals having a smaller particle size (see FIG. 2 (B)).

The natural drying (sun drying) was performed by leaving the samples at rest for one month at a place where only a roof was provided so as to be protected from rain when in December, the average temperature was 8.3° C., the maximum temperature of 11.8° C., the minimum temperature of 5.4° C., and the sum total of duration of sunshine was 112 hours, so that about 140 g of moisture was vaporized in this period.

Each of the thus-obtained crystals was analyzed by ICP to examine the Ca content in a crystal. The analytical results are shown in Table 2 given below.

TABLE 2

| Drying technique | Natural drying (sun drying) | Spontaneous vaporization (water bath) |
|---|---|---|
| Drawing of crystals | FIG. 2(A) | FIG. 2(B) |
| Particle size | Large | Small |
| Weight of crystals (g) | 33.1 | 25.3 |
| Amount of filtrate after crystal precipitation (ml) | 27.5 | 33.0 |
| Content of crystalline Ca (wt/%) | 0.20 | 0.32 |
| Content of crystalline Mg (wt/%) | 9.7 | 10.0 |

As shown in Table 2, it has been seen that the content of Ca in crystals can be reduced by natural drying (sun drying).

(Roasting)

Next, the crystals of magnesium sulfate heptahydrate resulting from the separation from a solution were divided into two portions, which were placed in two crucibles, respectively. Carbon (pure graphite; C=100%) as a reductant was added to the crucibles in amounts of 0.025 mol and 0.05 mol, respectively, followed by heating to 1000° C. under blowing air at a rate of 2.5 liters per minute, then holding for 1 hour, and cooling slowly. The additive amount of the carbon corresponded to 1 equivalent and 2 equivalents, respectively, based on the amount necessary for the reaction.

Figure 5:
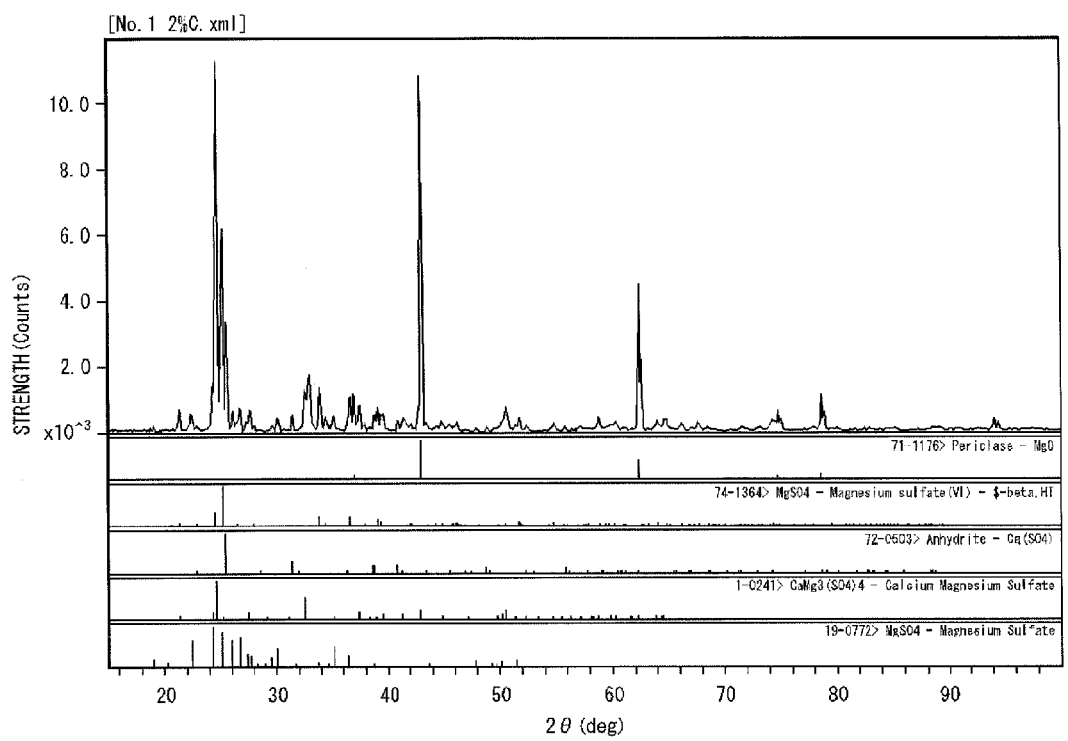
FIG. 5 is a graph showing an XRD analytical result of crystals obtained when the additive amount of carbon is adjusted to 0.025 mol.
Figure 6:
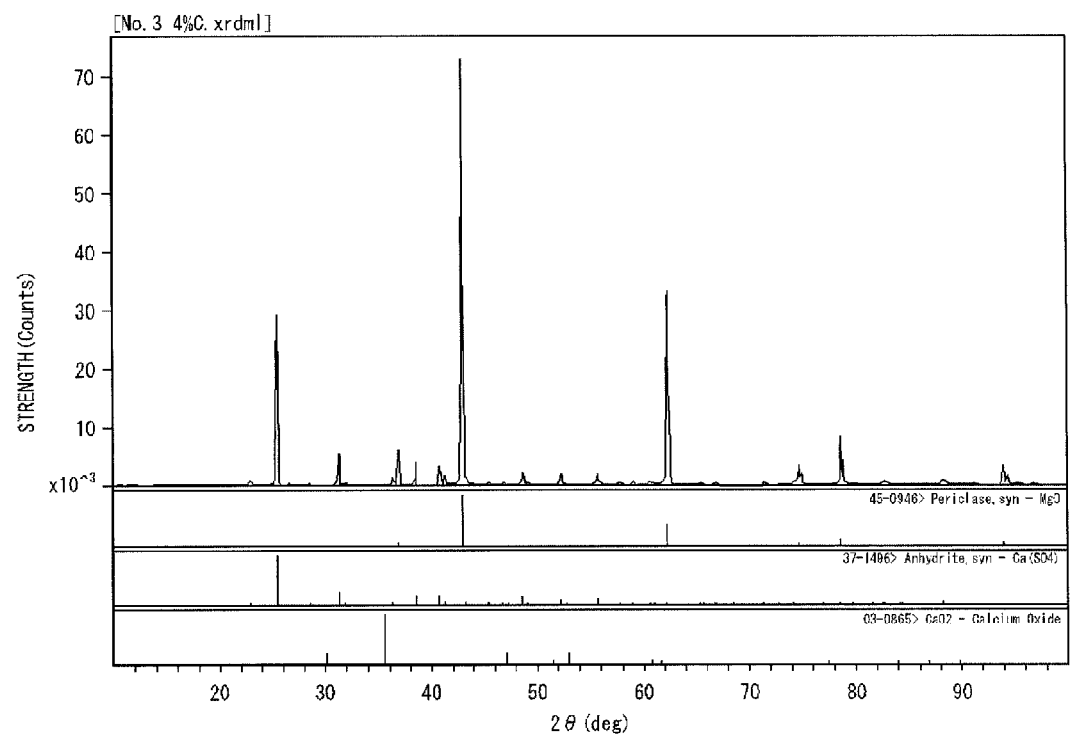
FIG. 6 is a graph showing an XRD analytical result of crystals obtained when the additive amount of carbon is adjusted to 0.05 mol.

After cooling, the crystals were taken out of the respective crucibles and their forms were analyzed by using an X-ray diffraction (XRD) apparatus. FIG. 5 is the result of the XRD analysis of the crystals obtained when the additive amount of the carbon was 0.025 mol, and FIG. 6 is the result of the XRD analysis of the crystals obtained when the additive amount of the carbon was 0.05 mol.

The result shown in FIG. 5 shows that when the carbon loading is 0.025 mol (1 equivalent), a peak of magnesium sulfate has been detected, which shows that all the crystals of the magnesium sulfate obtained via concentration and separation have not been converted into magnesium oxide. In other words, insufficient roasting has been confirmed. On the other hand, from the result shown in FIG. 6, no peaks of magnesium sulfate were detected when the carbon additive amount was 0.05 mol (2 equivalents) and only a peak of magnesium oxide was detected. In other words, all the magnesium sulfate obtained via concentration and separation has been converted into magnesium oxide and it was confirmed that roasting had been carried out sufficiently. ICP analysis of the magnesium oxide obtained revealed that the content of magnesium was 55% by weight and the content of calcium was 5% by weight.

The results described above show that roasting magnesium sulfate using 2 or more equivalents of a carbon-based reductant makes it possible to roast all crystals into magnesium oxide in a short period of time.

(Washing)

Next, 10 g of magnesium oxide roasted under the condition where 2 equivalents of a reductant was added was prepared and put into a 200 ml beaker. Then, 120 ml of pure water was poured into the beaker, stirred, and subsequently left at rest to allow the magnesium oxide to settle. The supernatant liquid was then discharged, so that an unreacted reductant or a reacted ash that floated was separated. Then, solid-liquid separation was carried out by using a filter paper and a filter bottle to produce magnesium oxide. Crystal of the resulting magnesium oxide were dried and analyzed by ICP.

As a result, the magnesium content in the magnesium oxide was 55% by weight and did not change with the above content before washing. On the other hand, the calcium content decreased significantly from 5% of before washing to 0.66%, and thus calcium that had remained in crystals was reduced, so that magnesium oxide being low in impurity content and high in purity was produced.

Example 2

In the roasting step of Example 1, crystals of magnesium sulfate heptahydrate obtained by separating from a solution prepared in the same way as Example 1 were divided into two portions, which were fed into two crucibles, respectively. Charcoal with the composition shown in Table 3 as a reductant was added to the crucibles in carbon amounts of 0.025 mol and 0.05 mol, respectively, followed by heating to 1000° C. under blowing air at a rate of 2.5 liters per minute, then holding for 1 hour, and cooling slowly. The additive amount of the charcoal corresponded to 1 equivalent and 2 equivalents, respectively, based on the amount necessary for the reaction.

TABLE 3

| Analysis item | |
|---|---|
| Moisture (%) | 9.0 |
| Ash (%) | 1.9 |
| Fixed carbon (%) | 94 |
| Calcium (%) | 1.0 |
| Magnesium (%) | 0.3 |
| Manganese (%) | <0.1 |
| Iron oxide (%) | <0.1 |
| Potassium + sodium (%) | 0.5 |
| Silicic acid (%) | <0.1 |
| Phosphoric acid (%) | 0.1 |
| Others including carbonic acid (%) | 0.1 |

After cooling, the crystals were taken out of the respective crucibles and their forms were analyzed by using an X-ray diffraction (XRD) apparatus.

Like Example 1, when the additive amount of charcoal was 0.025 mol (1 equivalent), a peak of magnesium sulfate the same as that of FIG. 5 was detected, and all of the crystals of the magnesium sulfate resulting from concentration and separation were not converted into magnesium oxide. On the other hand, like FIG. 6, no peaks of magnesium sulfate were detected when the charcoal loading was 0.05 mol (2 equivalents) and only a peak of magnesium oxide was detected. In other words, all the magnesium sulfate obtained via concentration and separation has been converted into magnesium oxide and it was confirmed that roasting had been carried out sufficiently.

The results described above show that roasting magnesium sulfate in a carbon amount of 2 or more equivalents makes it possible to roast all crystals into magnesium oxide in a short period of time even if charcoal is used as a reductant.

The invention claimed is:

1. An operating method in hydrometallurgy of nickel oxide ore, the method comprising:
    adding sulfuric acid to a slurry of nickel oxide ore to leach the ore under heat and pressure;
    separating a leach residue to obtain a leachate;
    adding a purified magnesium oxide to the leachate and separating a neutralized precipitate containing an impurity to obtain a neutralization final liquid comprising nickel, cobalt, magnesium and calcium;
    subjecting the neutralization final liquid to sulfurization treatment to obtain sulfide and a barren liquor solution comprising the magnesium and calcium;
    precipitating calcium sulfate by concentrating the barren liquor solution and separating the calcium;
    precipitating magnesium sulfate by further concentrating the concentrated barren liquor solution and separating the magnesium sulfate;
    roasting the magnesium sulfate together with a reductant to obtain magnesium oxide and sulfur dioxide; and
    washing the magnesium oxide to obtain the purified magnesium oxide,
    wherein separating the calcium is ended at a time at which the specific gravity of the concentrated solution is 1.2 g/cm$^3$.

2. The operating method in hydrometallurgy of nickel oxide ore according to claim 1, wherein concentrating the barren liquor solution and further concentrating the barren liquor solution are performed by natural drying.

3. The operating method in hydrometallurgy of nickel oxide ore according to claim 1, wherein the purified magnesium oxide is added to the leachate to adjust the neutralization final liquid to a pH in the range of 7.0 to 8.5.

4. The operating method in hydrometallurgy of nickel oxide ore according to claim 1, wherein the reductant is at least one of coke, coal, charcoal, bamboo coal and spent activated carbon.

5. The operating method in hydrometallurgy of nickel oxide ore according to claim 1, wherein the sulfur dioxide is converted into sulfuric acid and the resulting sulfuric acid is iteratively used as the sulfuric acid for the leaching of the nickel oxide ore.

* * * * *